(12) United States Patent
Irie et al.

(10) Patent No.: US 6,366,852 B2
(45) Date of Patent: Apr. 2, 2002

(54) NAVIGATION DEVICE

(75) Inventors: Takashi Irie; Masatsugu Norimoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/768,460

(22) Filed: Jan. 25, 2001

Related U.S. Application Data

(63) Continuation of application No. PCT/JP99/02748, filed on May 25, 1999.

(51) Int. Cl.[7] .................................................. G05D 1/00
(52) U.S. Cl. ........................ 701/211; 701/207; 701/208; 701/200; 340/990; 340/995
(58) Field of Search ................................. 701/200, 201, 701/202, 203, 207, 208, 209, 211, 212, 213; 340/990, 995

(56) References Cited

U.S. PATENT DOCUMENTS

| | | | | |
|---|---|---|---|---|
| 5,513,110 A | * | 4/1996 | Fujita et al. ................ | 701/207 |
| 5,684,704 A | * | 11/1997 | Okazaki ..................... | 701/208 |
| 5,801,680 A | * | 9/1998 | Minakuchi ................. | 345/150 |
| 5,845,228 A | * | 12/1998 | Uekawa et al. ............ | 701/209 |
| 5,910,177 A | * | 6/1999 | Zuber ........................ | 701/202 |
| 6,067,502 A | * | 5/2000 | Hayashida et al. ......... | 701/209 |

FOREIGN PATENT DOCUMENTS

| | | |
|---|---|---|
| JP | A566131 | 3/1993 |
| JP | A5297800 | 11/1993 |
| JP | A696392 | 4/1994 |
| JP | A7248232 | 9/1995 |
| JP | A7294276 | 11/1995 |
| JP | A9190596 | 7/1997 |
| WO | a1-9851995 | 11/1998 |

* cited by examiner

Primary Examiner—William A. Cuchlinski, Jr.
Assistant Examiner—Marthey Marc-Coleman

(57) ABSTRACT

A navigation device includes a map information storage means for storing map information such as nodes, links and the like, a present position detection means for detecting a present position of a moving body, a route searching means for searching a route from a present position to a guide point based on the map information, a voice guide message generation means for generating a voice guide message corresponding to the searched route, and a voice output means for outputting the voice guide message. The navigation device is adapted to store a level of importance of nodes and links as a part of said map information, and the voice guide message generation means selects links and nodes on the searched route based on the level of importance and generates a voice guide message corresponding to the selected nodes and links.

8 Claims, 12 Drawing Sheets

DISTANCE X(km) TO GUIDE POINT

FIG.14

| SUPPLEMENTARY VOICE DATA | |
|---|---|
| GF=0 | GF=1 |
| 301 TURN RIGHT<br>302 TURN LEFT<br>303 CONTINUE STRAIGHT<br>304 MAKE U-TURN<br>305 CROSS<br>306 ENTER FROM<br>307 EXIT<br>308 PASS ON ... SIDE<br>309 TURN RIGHT AT MARK<br>310 TURN LEFT AT MARK<br>311 CONTINUE STRAIGHT AT MARK | 401 TURN RIGHT AND<br>402 TURN LEFT AND<br>403 CONTINUE STRAIGHT AND<br>404 MAKE U-TURN AND<br>405 CROSS AND<br>406 ENTER FROM ....AND<br>407 EXIT AND<br>408 PASS ON ... SIDE AND<br>409 AT THE MARK... |

FIG.15

| DISTINGUISHING NUMBER | NAME | NODE NUMBER ON START LINK | NODE NUMBER ON FINISH LINK | GF |
|---|---|---|---|---|
| L001 | NATIONAL HIGHWAY 345 | N002 | N005 | 1 |
| S251 | NISHIYAMA SHRINE | - | - | 1 |
| N005 | KITA INTERSECTION | - | - | 0 |
| N006 | HIGASHI INTERCHANGE | - | - | 1 |
| N009 | HOKUTO EXPRESSWAY | N006 | N009 | 1 |
| N009 | MORI INTERCHANGE | - | - | 0 |
| L00B | NATIONAL HIGHWAY 333 | N00C | N00D | 0 |

500: rows L001, S251, N005
501: rows N006, N009, N009

CONTINUE STRAIGHT ON NATIONAL HIGHWAY 345, PASS ON NISHIYAMA SHRINE SIDE, TURN LEFT AT NORTH INTERSECTION. ENTER EAST INTERCHANGE, CONTINUE STRAIGHT ON HOKUTO EXPRESSWAY, EXIT MORI INTERCHANGE.
CONTINUE STRAIGHT ON NATIONAL HIGHWAY 333

NAVIGATION DEVICE

CROSS-REFERENCE TO THE RELATED APPLICATION

This application is a continuation of international Application No. PCT/JP99/02748, whose international filing date is May 25, 1999, the disclosures of which Application are incorporated by reference herein.

BACKGROUND OF THE INVENTION

1. Field of the Invention

The present invention relates to a navigation device which is mounted in a moving body and which guides a route from a present position to a destination.

2. Description of Related Art

Navigation devices which guide a route from a current position of an automobile to a destination while driving have been widely applied. In this type of navigation device, when a destination is set by a user, the device searches a preferred route from the current position to the destination. When the searched route is presented to a user, it is common to present the route in an "entire route format" in which a route from a geographical position, at which a destination is set, to the destination is displayed on the same screen by switching a map scale. Furthermore, a method is employed of displaying more detailed information about the route by scrolling the map display automatically or manually along the route by switching to a detailed map display with a large map scale ratio. In addition, a method of sequential display of guiding maps of intersections on the route forward of a current position, or a method of displaying the route schematically by main branching points on the display device are also known in the art. Furthermore, it is possible to execute the guiding operation by use of voice commands.

FIG. 1 is a block diagram showing a first conventional navigation device as disclosed in JP-A-5-297800. In the figure, reference numeral 1 denotes a touch switch for inputting a destination or the like, 2 is a vehicle speed sensor for detecting a vehicle speed, 3 is a bearing sensor for detecting a bearing, 4 is an external storage device for storing information displaying classes of roads connecting branching points or information displaying classes of branching point of roads and pre-stored map information data. 5 is a display device for displaying information regarding main points such as branching points which are on a route from the present position to the destination. 6 is a control device which searches a travel route of the vehicle based on an input signal from the bearing sensor 3 and the vehicle sensor 2 and an input signal from the switch 1 and which displays main branching points on the travel route in summary form on the display device 5.

The operation of the first conventional navigation device will be described below.

Firstly, route searching is executed. The route searching is executed according to a Dijkstra method. Of the routes connecting the present position and the destination, the device searches a route passing along main roads in which there are few right or left turns and in which the names of intersections at which turns are made are known. The search is made on the basis of the map information data stored in the external storage device 4.

After the route is searched, the number of nodes contained on the route is counted and it is determined whether the number of nodes is less than or equal to 10. When the number of nodes is less than or equal to 10, the display process is executed to display the searched route.

On the other hand, when there are more than 10 nodes, a summarizing process is applied to the nodes contained on the route in which they are summarized based on informational value of each node. The summarizing process entails deleting those nodes of low information value until the number of nodes contained on the route are less than or equal to 10. Thereafter, display processing is executed. Herein information value is a product of a turning coefficient, a name presence/absence coefficient and a node category coefficient. The node category coefficient is a fixed coefficient corresponding to categories of nodes such as expressway entrance/exit, tollway entrance/exit or national road intersection. The node name presence/absence coefficient is a fixed coefficient which corresponds to the presence or absence of a name of the node. The turning coefficient is a fixed coefficient which corresponds to the presence or absence of left or right turns.

In the display process, the name of the destination and present position, the name of main branching points on the route from the present position to the destination, the distance between each branching point, representative place names which indicate the direction of travel, and the names of roads which should be taken at branching points are displayed on the display device 5.

FIG. 2 is a block diagram of a second conventional navigation device as disclosed in International Publication WO98/51995. In the figure, reference numeral 10 denotes a control means which performs control of the overall device and each type of calculation in the navigation device. 11 is a map information storage means which stores digitized map information data such as intersection data, road data and the like. 12 is a present position detection means which detects a present position of the moving body in which the navigation device is mounted.

13 is a route setting means which sets a route between two points on a map on the basis of map information data stored in the map information storage means 11. 14 is a guide object intersection detection means which detects a guide object intersection to be guided on the route set by the route setting means 13. 15 is a quantizing calculation means which quantizes the route of the moving body onto a schematic map displaying the characteristic features of the route.

16 is a display means which displays a route quantized by the quantizing calculation means with respect to a guide object intersection detected by the guide object intersection detection means 14. 17 is a voice guide message generation means having a voice information storage means (not shown) which stores necessary words or phrases for guide messages as voice wave form data. The voice guide message generation means selects voice wave form data such as words or phrases for guide messages and generates such combinations as guide messages when a quantized route of the moving body is displayed on the display means 16. 18 is a voice output means which notifies a user by voice commands of guide messages generated by the voice guide message generation means.

The operation of the second conventional navigation device will be described below.

FIG. 3 is a flowchart explaining the operation of the second conventional navigation device shown in FIG. 2.

Firstly, in a step ST1, the route setting means 13 sets two points on the map on the basis of latitude and longitude from the map information data read from the map information storage means 11 and then sets a route between the two points using a general search algorithm on a network such as a Dijkstra method or the like.

Then, in a step ST2, the present position detection means 12 detects a present position (C1) of the moving body. In a step ST3, the flags FL1, FL2, FL3 are respectively initialized to 0.

Then, in a step ST4, the guide object intersection detection means 14 extracts an intersection with, for example, more than three roads being connected to the intersection as a forward guide object intersection (C2). The intersection is an intersection on the route set by the route setting means 13 and, of the two geographical points set by the route setting means, the intersection is further forward than present position (C1) detected by the present position detection means 12.

In the step ST5, the detection of the present position (C1) of the moving body is performed again by the present position detection means 12 and in a step ST6, a road distance (L1) between the present position (C1) of the moving body and the forward guide object intersection (C2) is calculated on the basis of map information data read from the map information storage means 11.

Then, in a step ST7, further processing operations are selected in response to this distance (L1).

When the distance (L1) is greater than a predetermined reference distance (L2) (for example 1000 meters), the routine progresses to step ST8 and it is determined whether the flag FL1 has a value of 0 or not. When the value of the flag is 0, in a step ST9, a guide output A which is related to the forward guide object intersection (C2) is executed. The guide output A comprises extracting only the section to the forward guiding object intersection (C2) extracted by the quantizing calculation means 15 of the road on the route on the map. Then, the result is quantized to a simple arrow shape and a display map related to the forward guide object intersection (C2) is displayed on the display means 16. A guide voice message related to the forward guide object intersection (C2) is generated by the voice guide message generation means 17 and the message is reported by voice commands from the voice output means 18. After the execution of the guide output A, in a step ST10, the flag FL1 is varied to a value of 1 and the fact that the guide output A in relation to the forward guide object intersection (C2) has been executed is stored.

Thereafter, in a step ST11, it is determined whether or not the process of setting the route by the route setting means 13 is completed. When it is completed, the guide process is terminated. When it is not completed, the routine returns to a step ST5 and executes the steps of the routine after step ST6.

When the flag FL1 does not have a value of 0 in step ST8, since the guide output A has already been executed, the routine returns to a step ST5.

In a step ST7, when the distance (L1) is less than or equal to the reference value (L2) and greater than the predetermined reference value (L3) (for example 300 meters), the routine progresses to a step ST12, and it is determined whether or not the flag FL2 has a value of 0. When the flag FL2 has a value of 0, in the step ST13, a guide output B related to the forward guide object intersection (C2) is executed. The guide output B comprises extracting only the route section connecting the forward guiding object intersection (C2) of the road on the map extracted by the quantizing calculation means 15. Then, the result is quantized to a simple arrow shape and a display map related to the forward guide object intersection (C2) is displayed on the display means 16. A guide voice message related to the forward guide object intersection (C2) is generated by the voice guide message generation means 17 and the message is reported by voice commands from the voice output means 18. After the execution of the guide output B, in a step ST14, the flag FL2 is varied to a value of 1 and the fact that the guide output B in relation to the forward guide object intersection (C2) has been executed is stored.

Thereafter, in a step ST11, it is determined whether or not the process of setting the route by the route setting means 13 is completed. When it is completed, the guide process is terminated. When it is not completed, the routine returns to a step ST5 and executes the steps of the routine after step ST6.

When the flag FL2 does not have a value of 0 in step ST12, since the guide output has already been executed, the routine returns to a step ST5.

When, in a step ST7, the distance (L1) has a value less than the reference value (L3), the routine progresses to a step ST15 and it is determined whether or not the flag FL3 has a value of 0 or not. When the value of the flag is 0, in a step ST16, the guide output C related to the forward guide object intersection (C2) is executed. The guide output C comprises extracting the present position of the moving body, roads other than roads on the route, route roads connected to the forward guiding object intersection (C2) and the forward guiding object intersection (C2) extracted by the quantizing calculation means 15 on the map. Then, the result is quantized to a simple arrow shape and a display map related to the forward guide object intersection (C2) is displayed on the display means 16. A guide voice message related to the forward guide object intersection (C2) is generated by the voice guide message generation means 17 and the message is reported by voice commands from the voice output means 18. After the execution of the guide output C, in a step ST17, the flag FL3 is varied to a value of 1 and the fact that the guide output C in relation to the forward guide object intersection (C2) has been executed is stored.

Thereafter, in a step ST11, it is determined whether or not the process of setting the route by the route setting means 13 is completed. When it is completed, the guide process is terminated. When it is not completed, the routine returns to a step ST5 and executes the steps of the routine after step ST6.

When the flag FL3 does not have a value of 0 in step ST15, since the guide output C has already been executed, the routine returns to a step ST3, and the flags FL1, FL2, FL3 are initialized to 0. In a step ST4, the forward guide object intersection (C2) is extracted.

Since the conventional navigation device is constructed as above, the problem has arisen that safe operation of the vehicle can be affected as it is necessary for a user to monitor the guide display even when display nodes are displayed in summary form by a summarizing process. Furthermore, the number of guiding nodes provided to guide the entire route by voice commands increases and the problem has arisen that nodes can not be adapted to guide the entire route appropriately in a short time.

Furthermore, when the number of guide nodes is reduced to a predetermined number of summarized nodes in a convention navigation device, the problem has arisen that it is difficult to make guide nodes correspond to a predetermined number of nodes when a plurality of nodes with the same informational value exists.

SUMMARY OF THE INVENTION

The present invention is proposed to solve the above problems and has the object of providing a navigation device adapted to store the level of importance of nodes and links and select nodes and links on the searched route based on the level of importance or time for playing voice information. In the navigation device, a voice guide message is generated corresponding to the selected nodes and links and guiding of the route is executed by the voice guide message. Thus, it is possible to guide an entire route appropriately in a short time by voice commands.

The present invention has the further object of providing a navigation device in which when a plurality of nodes and links with the same importance exists and the number of such nodes and links is not equal to a predetermined reference number, nodes and links in proximity to the present position, the number of which corresponds with the predetermined reference number, is selected from nodes and links with the same importance, thereby to make the number of guide nodes and the like accurately correspond with the predetermined reference number.

A navigation device of the present invention is adapted to store a level of importance of each node and link as a part of map information in a map information storage means, to select the nodes and links on the searched route based on the level of importance and to generate a voice guide message corresponding to the selected links and nodes. In this way, it is possible to guide an entire route appropriately in a short period of time by voice commands.

The navigation device of the present invention may be adapted to select the nodes and links on the searched route in such a manner that the level of importance of the selected nodes and links is less than or equal to a predetermined reference level and the number of the selected nodes and links is less than or equal to a predetermined reference number, and to generate a voice guide message corresponding to the selected nodes and links. In such a way, even when the number of nodes and links with a high level of importance is less than a predetermined reference number, the voice guiding with respect to the nodes and links having low level of importance is not executed. Thus, it is possible to guide the entire route appropriately.

The navigation device of the present invention may be adapted to delete nodes and links, which are located in proximity to the guide point, from the nodes and links having the same level of importance and to make the number of the selected nodes and links equal to a predetermined reference number, when there exists a plurality of nodes and links with the same level of importance and the number of the selected nodes and links is not equal to the predetermined reference number. In this way, it is possible to make the number of nodes and links to be guided correspond accurately with the predetermined reference number.

The navigation device of the present invention may be provided with a reference value setting means for setting a predetermined reference value and a reference number setting means for setting a predetermined reference number. In this way, it is possible to provide a voice guide with the desired amount and level of importance.

The navigation device of the present invention may be adapted to store information about voice playing times relating to names of each link and node as a part of map information in the map information storage means, to select the nodes and links on the searched route in order of highest importance in such a manner that the voice playing time for the voice guide message is less than or equal to a predetermined reference value, and to generate the voice guide message corresponding to the selected nodes and links. In such a way, it is possible to accurately make the time taken for voice guiding under a predetermined reference value.

BRIEF DESCRIPTION OF THE DRAWINGS

FIG. 14 is an example of a set of supplementary voice data.

FIG. 15 shows data related to extracted links and nodes as well as the proximate facilities to links and nodes in the process shown in FIG. 11 with respect to the route shown in FIG. 8.

DETAILED DESCRIPTION OF THE PREFERRED EMBODIMENTS

In order to describe the invention in greater detail, the preferred embodiments will be outlined below with reference to the accompanying figures.

Embodiment 1

Figure 1:
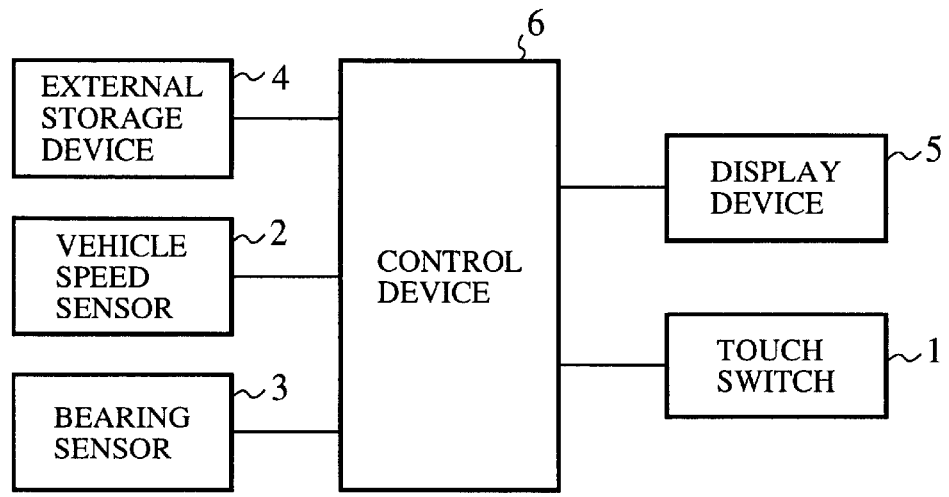
FIG. 1 is a block diagram showing a first convention navigation device.
Figure 2:
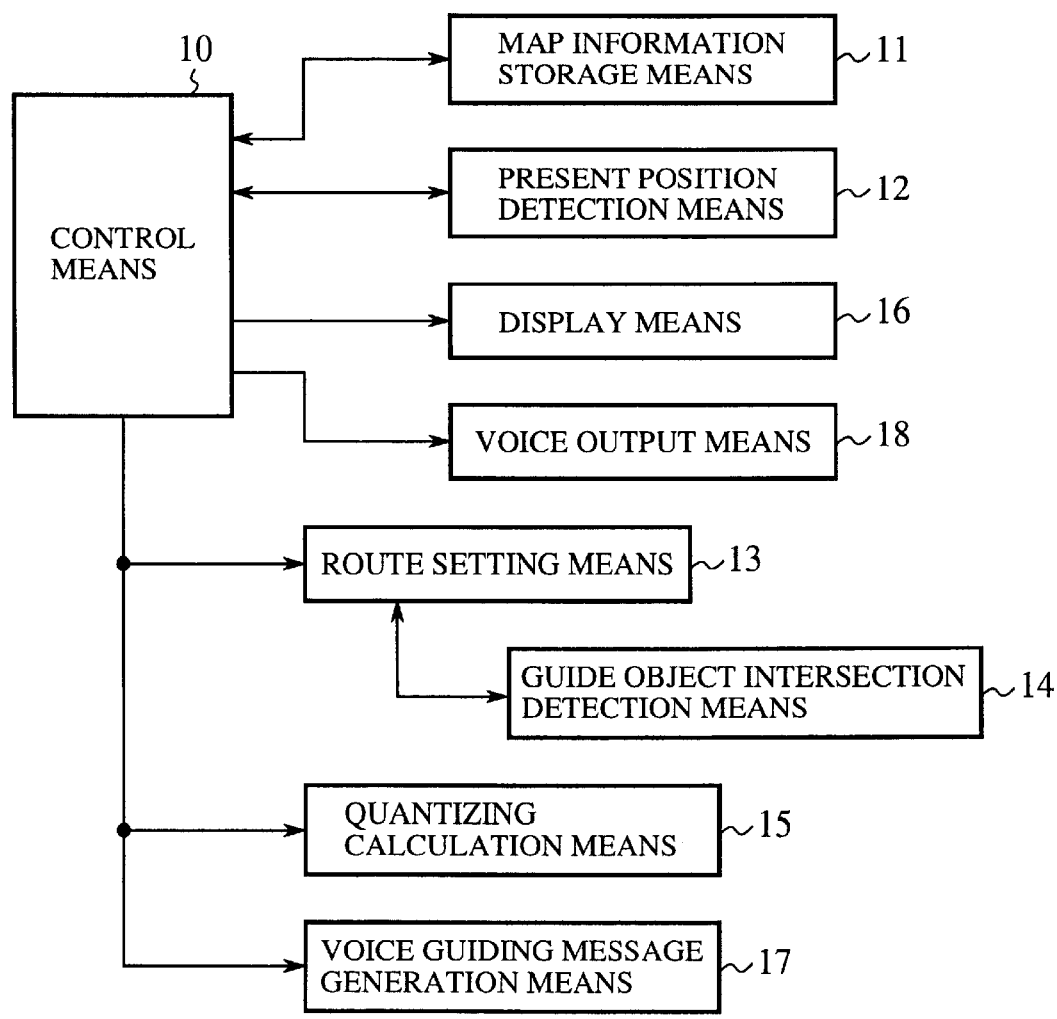
FIG. 2 is a block diagram showing a second convention navigation device.
Figure 3:
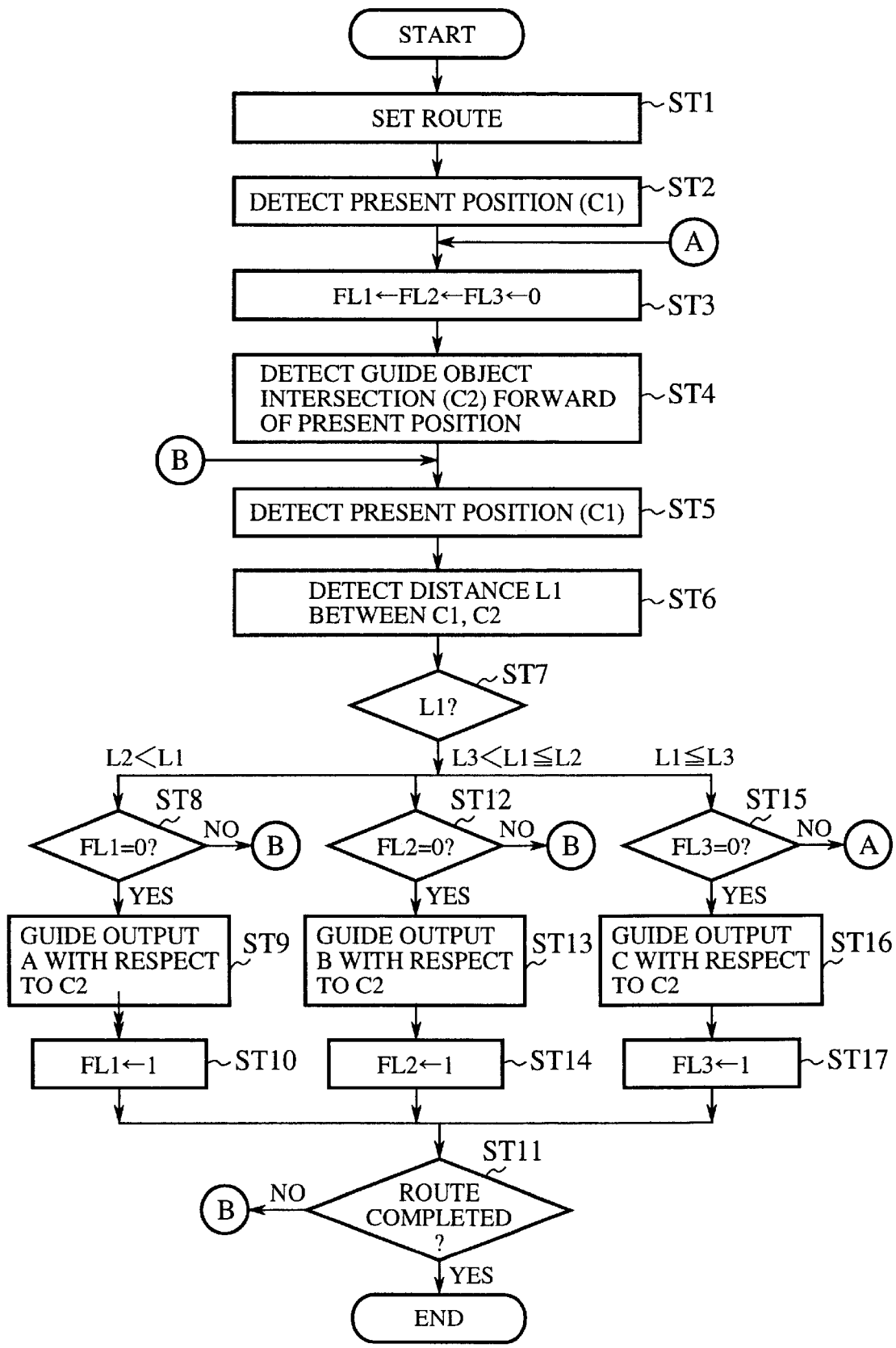
FIG. 3 is a flowchart explaining the operation of a second conventional navigation device.
Figure 4:
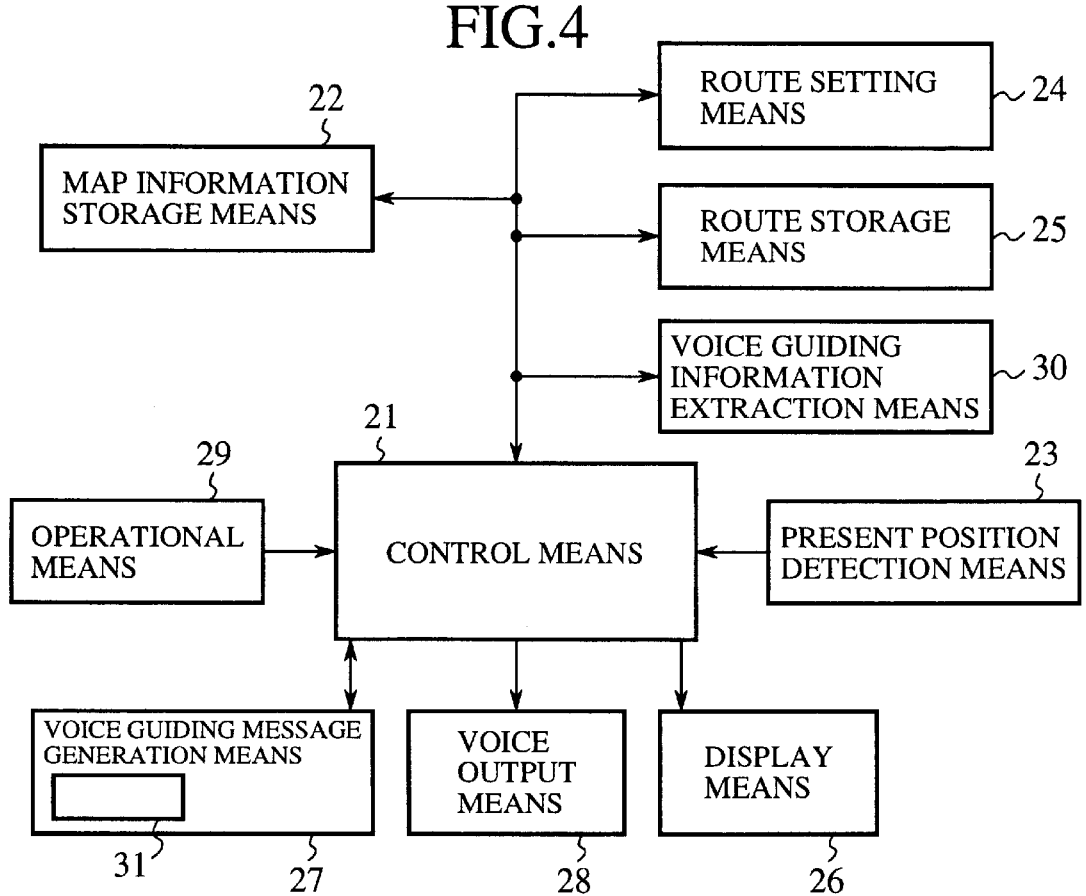
FIG. 4 is a block diagram showing a construction of a navigation device according to a first embodiment of the present invention.
Figure 5:
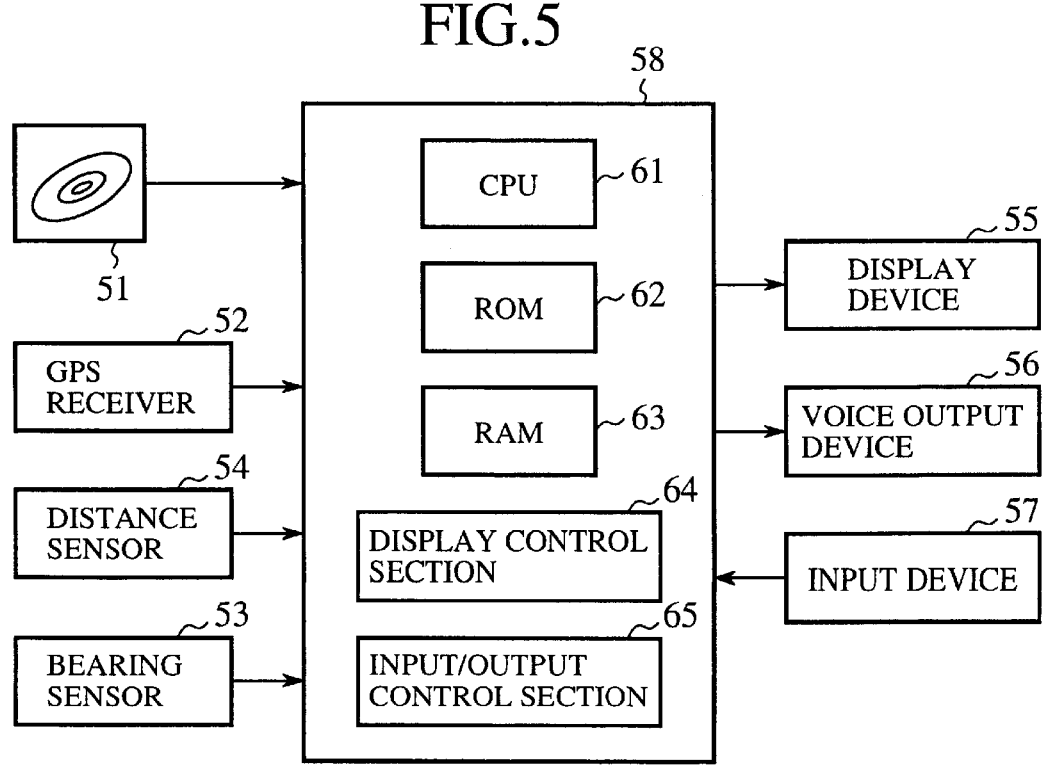
FIG. 5 is a block diagram showing a construction of the hardware in the navigation device shown in FIG. 4.

FIG. 4 is a block diagram showing a construction of a navigation device according to a first embodiment of the present invention. FIG. 5 is a block diagram showing a construction of the hardware in the navigation device shown in FIG. 4.

In FIG. 4, reference numeral 21 denotes a control means which executes each type of calculation in the navigation device and controls other constitutive elements. 22 is a map information storage means which pre-stores digitized map information data such as node data and link data displaying intersection points and roads. 23 is a present position detection means which detects a present position of a moving body in which the navigation device is mounted.

24 is a route search means which reads map information data stored in the map information storage means 22, which searches a route between two geographic points in a map on the basis of map information data for example on the basis of a Dijkstra method and which determines a single route. 25 is a route storage means which stores a route determined by the route search means 24.

26 is a display means which displays a route and the like stored in the route storage means 25 and a map based on map information data stored in the map information storage means 22.

27 is a voice guide message generation means which has a voice information storage means 31 which pre-stores voice waveform data such as words and phrases required for voice guide messages. Voice waveform data such as words and phrases constituting voice guide messages are selected when performing voice guiding and voice guide messages are generated by combining selected voice waveform data. 28 is a voice output means which outputs voice corresponding to voice guide messages generated by the voice guide message generated means 27 and which reports the guide message to a user.

29 is an operation means which is operated when commands are input into the navigation device by user and which supplies an input user commands to the control means 21. 30 is a voice guide information extraction means which extracts main guide information from guide information on a route stored in the route storage means 25.

In FIG. 5, 51 is a CD-ROM storing digitized map information and a read-out device thereof which correspond to the map information storage means 22 shown in FIG. 4.

52 is a GPS receiver which receives electromagnetic waves from an artificial satellite using a geo-positioning system (GPS) and which outputs a present position of the moving body in which a navigation device is mounted. 53 is a bearing sensor which detects a bearing in which the moving body is directed. 54 is a distance sensor which detects a movement distance of the moving body. These components correspond to the present position detection means 23 shown in FIG. 4.

55 is a display device which has for example a liquid crystal display and which displays map information, maps based on map information data, determined routes and the like. The display device corresponds to the display means 26 shown in FIG. 4. 56 is a voice output means which outputs voice guide messages. It corresponds to the voice output means shown in FIG. 4. 57 is an input device which has a switch operated when commands are input into the navigation device by a user and which supplies input user commands to a control unit 58. The input device 57 corresponds to the operation means shown in FIG. 4.

58 is a control unit provided with a central processing unit (CPU) 61, a read only memory (ROM) 62, a random access memory (RAM) 63, a display control section 64 and an input/output control section 65. The control unit 58 calculates each type of calculation in the navigation device and executes control of other constitutive components. The control unit corresponds to the control means 21, the route search means 24, the route storage means 25, the voice guide message generation means 27 and the voice guide information extraction means 30 shown in FIG. 4.

In the control unit 58, 61 is a CPU which executes processing of route searching and guide point extraction. 62 is a ROM which pre-stores data, programs and the like used by the CPU 61. 63 is a RAM into which map information data and programs used by the CPU 61 are loaded and which stores the calculation results of the CPU 61. 64 is a display control section which controls the display device 55 and which displays each type of image on the display device 55. 65 is an input/output control section which executes transfer of signals and each type of data by acting as an interface between the control unit 58 and each type of external device (CD-ROM and read-out device 51 to input device 57).

Figure 6:
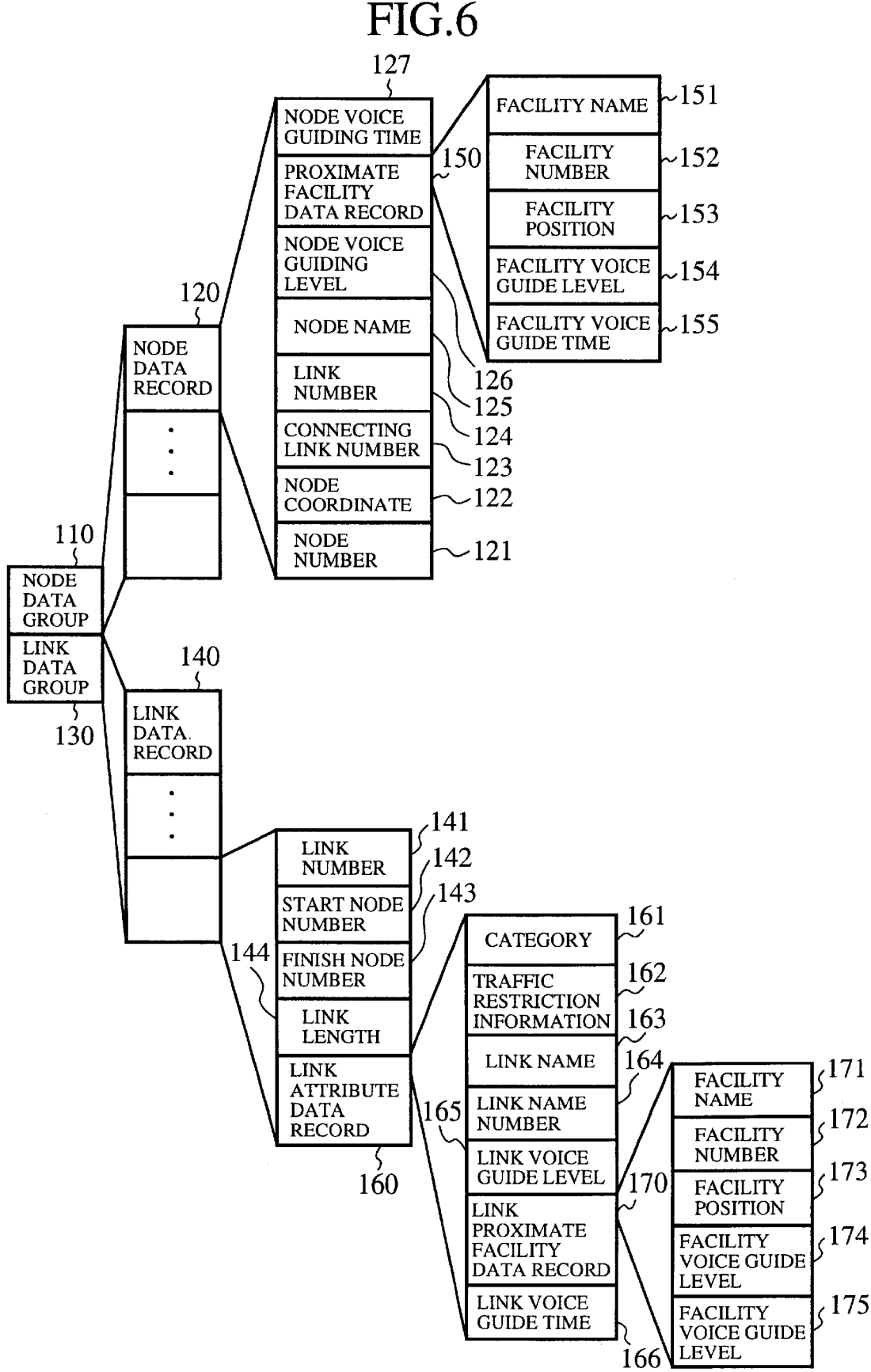
FIG. 6 shows an example of map information data stored in a map information storage means.

FIG. 6 shows an example of map information data stored in the map information storage means 22.

The map information data comprises a node data group 110 being the set of data related to nodes and a link data group 130 being the set of data related to links.

The node data group 110 is comprised by a node data record 120 which comprises each type of data related to each node. Each node data record 120 has a node number 121 which shows a distinguishing number which is uniquely assigned to a node which corresponds to the node data record 120, a node coordinate 122 which shows latitude and longitude of a position of a node on the map, a connecting link number 123 which shows the number of links connecting the node, a link number 124 of each link connected to the node, a node name 125 which is the name of the node, and a proximate facility data record 150 which is the set of data related to the proximate facilities which exist in the periphery of the node. A node voice guide level 126 which shows a level of importance of the referred node when performing voice guiding of a route containing the node and a node voice guide time 127 which shows a voice playing time required for voice guiding of the node are also provided.

The proximate facility data record 150 has a facility name 151 which shows the name of facilities in the environs of each node, a facility number 152 which displays a distinguishing number which is uniquely assigned to each facility, and a facility position 153 which shows the position of the facility which corresponds to the node. A facility voice guide level 154 which shows a level of importance of the referred facility when performing voice guiding of a route containing a node and a facility voice guide time 155 which shows a voice data playing time required for voice guiding of the facility are also provided.

The link data group 130 is comprised by link data record 140 which comprises each type of data related to each link. Furthermore each link data record 140 comprises a link number 141 which shows a distinguishing number which is uniquely assigned to a link which corresponds to link data records 140, an start node number 142 which shows a node connected to an start side of a link, a finish node number 143 which shows a node connected to a finish side of a link a link length 144 which shows the length of a link, and a link attribute data record 160 which is the set of each type of data related to a link attribute.

The link attribute data record 160 has a link category 161, a flow regulation information 162 which shows flow regulation of a road which corresponds to the link, a link name 163 which shows a name of a link, a link name number 164 which shows a distinguishing number which is uniquely assigned to the name of a link, a link voice guide level which shows the importance of a link referred to when performing voice guiding of a route containing the link, and a link voice guide time 166 which shows a voice data playing time required for voice guiding of the link. Furthermore, a link proximate facility data record 170 is provided which is a set of data related to facilities in the proximity of the link.

The link proximate facility data record 170 comprises a facility name 171 which shows a facility name, a facility number 172 which shows a distinguishing number which is uniquely assigned to the facility, a facility position 173 which shows a position of facilities with respect to the link, and a facility voice guide level 174 which shows the importance of a facility referred to when performing voice guiding of a route containing a link, and a facility voice guide time 175 which shows a voice data playing time required for voice guiding of the facility.

The level of importance shown by the facility voice guide level 174 can be determined by consideration of the level of reputation of the facility in the general community or with reference to a standard determined nationally. Alternatively they may be determined by any other standard.

On such a way, a node voice guide level 126 which shows a level of importance of each individual node and a corresponding node voice level guide time 127 which shows the time required for voice guiding the node, as well as a facility voice guide level 154 which shows a level of importance of each individual facility and a facility voice level guide time 155 which shows the time required for voice guiding the facility are contained in the map information data. Furthermore, a link voice guide level 165 which shows a level of importance of each individual link and a link voice level guide time 166 which shows the time required for voice guiding the link, as well as a facility voice guide level 174 which shows a level of importance of each individual facility and a facility voice level guide time 175 which shows the time required for voice guiding the facility are contained in the map information data.

The operation of the present invention will be described below.

Figure 7:
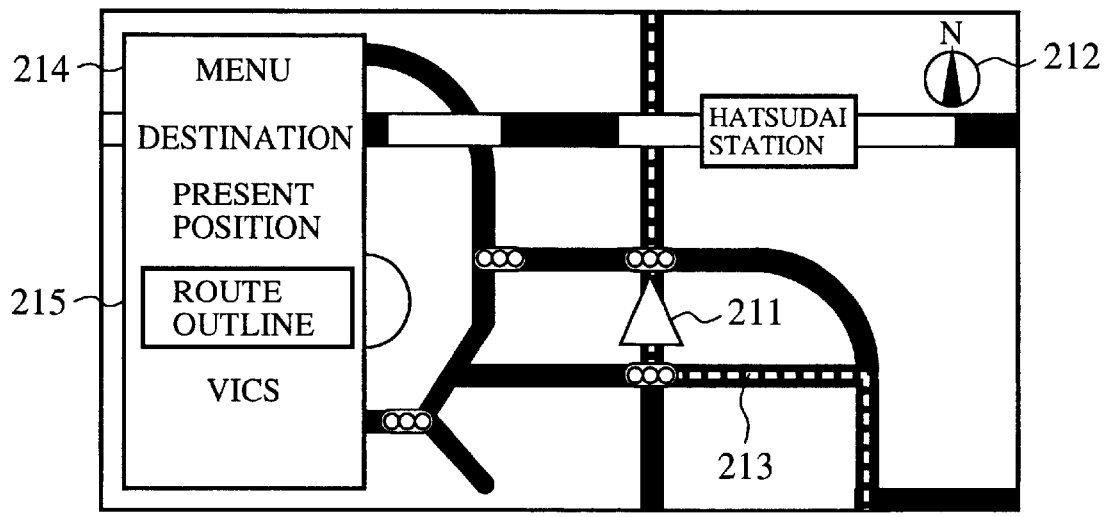
FIG. 7 shows an example of a menu and a map displayed on a display means.

The control means 21 displays a map corresponding to the map information data in the display means 26 in response to an operation of a user. A menu or the like is displayed for selecting each function. FIG. 7 shows an example of a menu and a map displayed on the display means 26. In the figure, a moving body mark 211 which shows the present position of the moving body, a bearing mark 212 which shows the direction of the map, a route line 213 which shows a route determined by the route search process to be discussed below and a menu 214 for selecting each function such as setting a destination are displayed on the map. When making a selection on the menu, a cursor is moved in response to an operation of a user on the operation means 29 and a selection is made.

When a destination is selected, firstly the route search process is performed. At this time, the present position detected by the present position detection means 23 and the destination input to the operation means 29 by a user are supplied to the route search means 24 by the control means 21. Map information data is read from the map information storage means 22 by the route search means 24, routes between the present position and the destination are searched by a Dijkstra method for example and a single route is determined. Information relating to nodes and links which comprise the route are stored in the route storage means 25.

Figure 8:
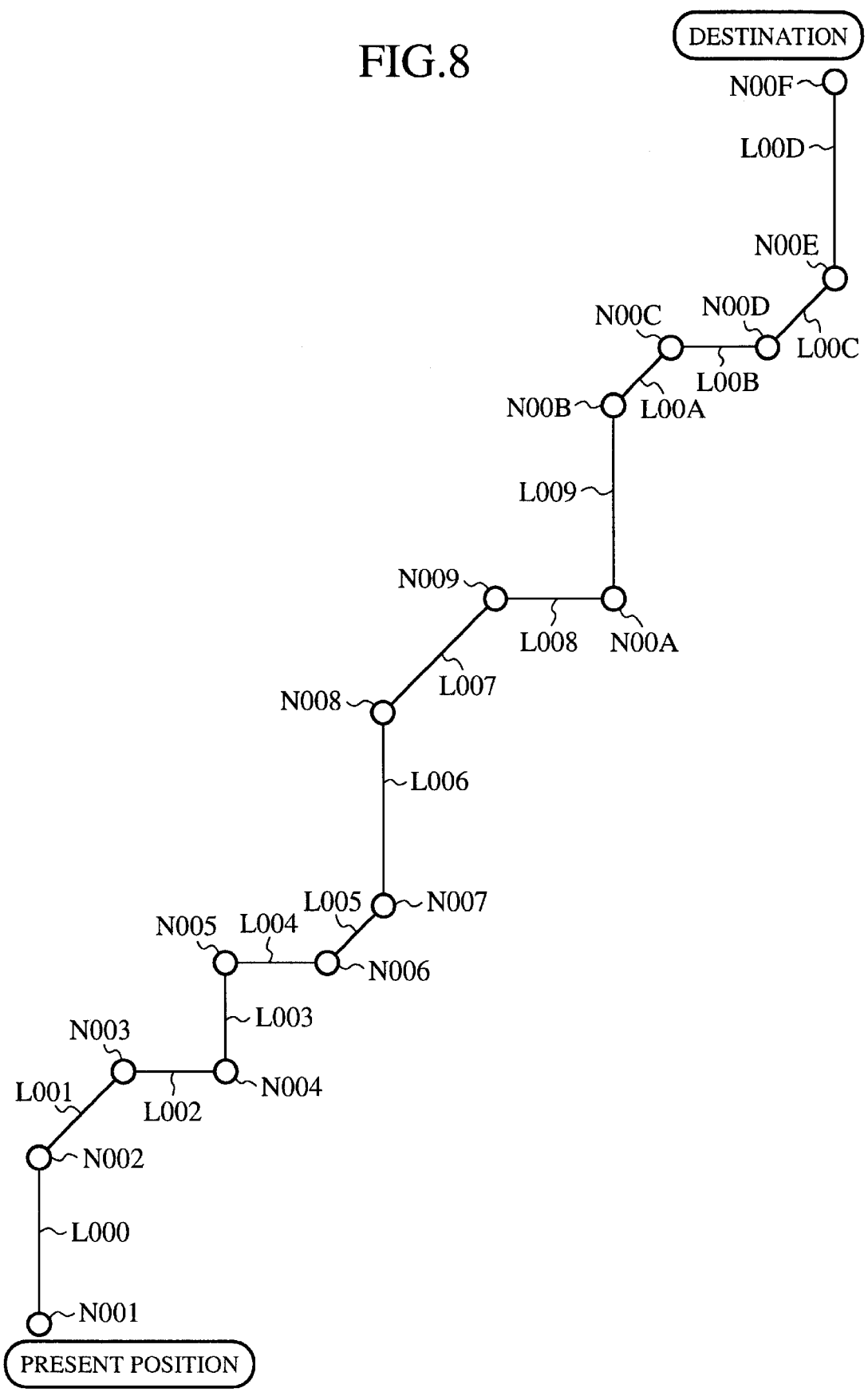
FIG. 8 shows an example of a route determined by a route searching means.

FIG. 8 is an example of a route determined by the route search means 24. On the route shown in FIG. 8, there are 15 nodes N001–N00F between a present position and a destination (the figures are hexadecimal numbers). There are 14 (=15-1) links L000–L00D (the figures are hexadecimal numbers) connecting each node.

Since route voice guiding becomes possible when a route is discovered by the route search process, options (route outline) corresponding to the function of route voice guide on the menu as shown in FIG. 7 are varied to be selectable by an operation of the user. That is to say, before execution of the route search process or when no route is found, it is not possible for the user to make a selection and the option "route outline" is covered (i.e. displayed gray).

Figure 9:
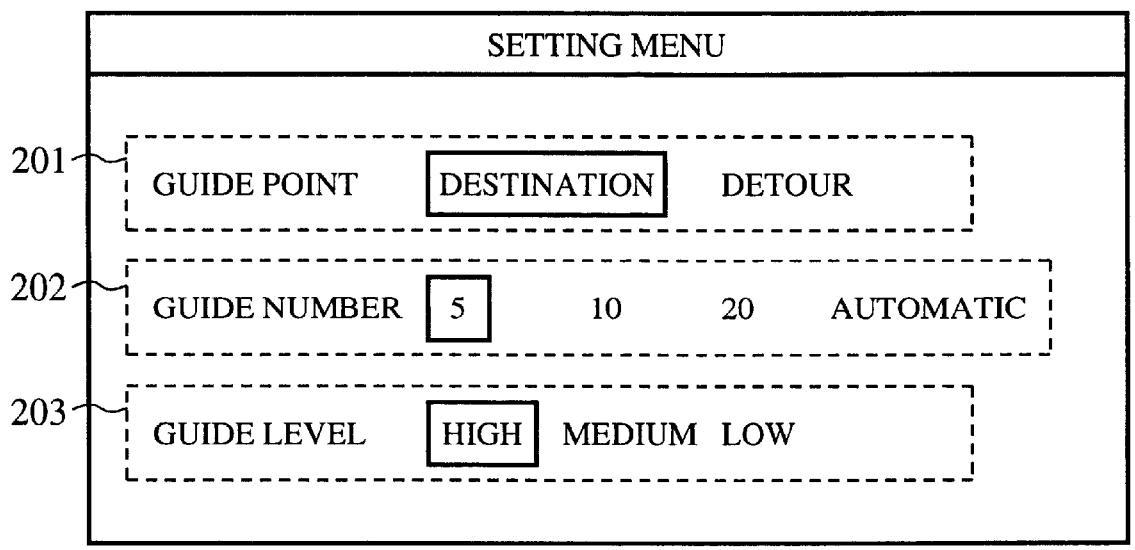
FIG. 9 shows an example of a menu for each setting category of route voice guides according to a first embodiment.

Each category of setting the route voice guide is executed before route voice guide processing. First the control means 21 displays a menu for each setting type of the route voice guide on the display means 26. FIG. 9 shows an example of a menu display for each type of setting of the route voice guide according to a first embodiment. In the menu in FIG. 9, there is a guide point selection term 201 which sets the execution of the route voice guide from a present position to any geographical point, a guide number selection term 202 which sets the total (guide number) of proximate facilities of a link or node as well as links and nodes which execute the voice guiding of the routes from a present position to a destination and a guide level selection term 203 which sets the level of detail of the voice guide.

There are the options "destination" and "detour" in the guide geographical point selection term 201. The selection of the option is executed by a user operating the operation means 29. When "destination" is selected, route voice guide from a present position to a destination is performed. When "route" is selected, route voice guide from a present position to a predetermined detour point is performed. Although there is one option "detour" in the guide geographical point selection term 201 in FIG. 9, the option may be adapted to provide a plurality of detours as options or to add an option "selectable geographical point" for the user to select a final geographical point for voice guiding in the displayed map.

The guide number selection term has the options "5", "10", "20" and "automatic". The selection of these options is performed by the operation of the operational means 29 by the user. When any of "5", "10" or "20" are selected, a respectively corresponding number (5, 10, 20) is set as the total number of proximate facilities for a link or node or as a link or node which executes the voice guide. When "automatic" is set, a guide number (discussed below) which is calculated in response to the distance from a present position to a guide point is set as the total number of proximate facilities for a link or node or as a link or node which executes the voice guide. When setting the guide number of a guided node or the like, apart from selecting a predetermined number as above, the device is adapted to allow a user to directly set a value as a guide number.

The guide level selection term 203 has the options "high", "medium" and "low". The selection of these options is executed by a user operating the operation means 29. When "high" is selected, voice guiding is performed to nodes, links and facilities proximate to nodes and links of low importance as far as allowed by the guide number above. When "low" is selected, voice guiding is performed only to nodes, links and facilities proximate to nodes and links of high importance as far as allowed by the guide number above. When "medium" is selected, voice guiding is performed only to nodes, links and facilities proximate to nodes and links of medium importance as far as allowed by the guide number above. The setting of the reference value for level of importance when selecting a guided node, apart from selecting a predetermined level as above may be performed by the user directly setting a level of importance with a value.

Thus, a reference number setting means and a reference value setting means which set a guide level and guide number are comprised by an operational means 29 and a display means 26 on which a menu is displayed.

Figure 10:
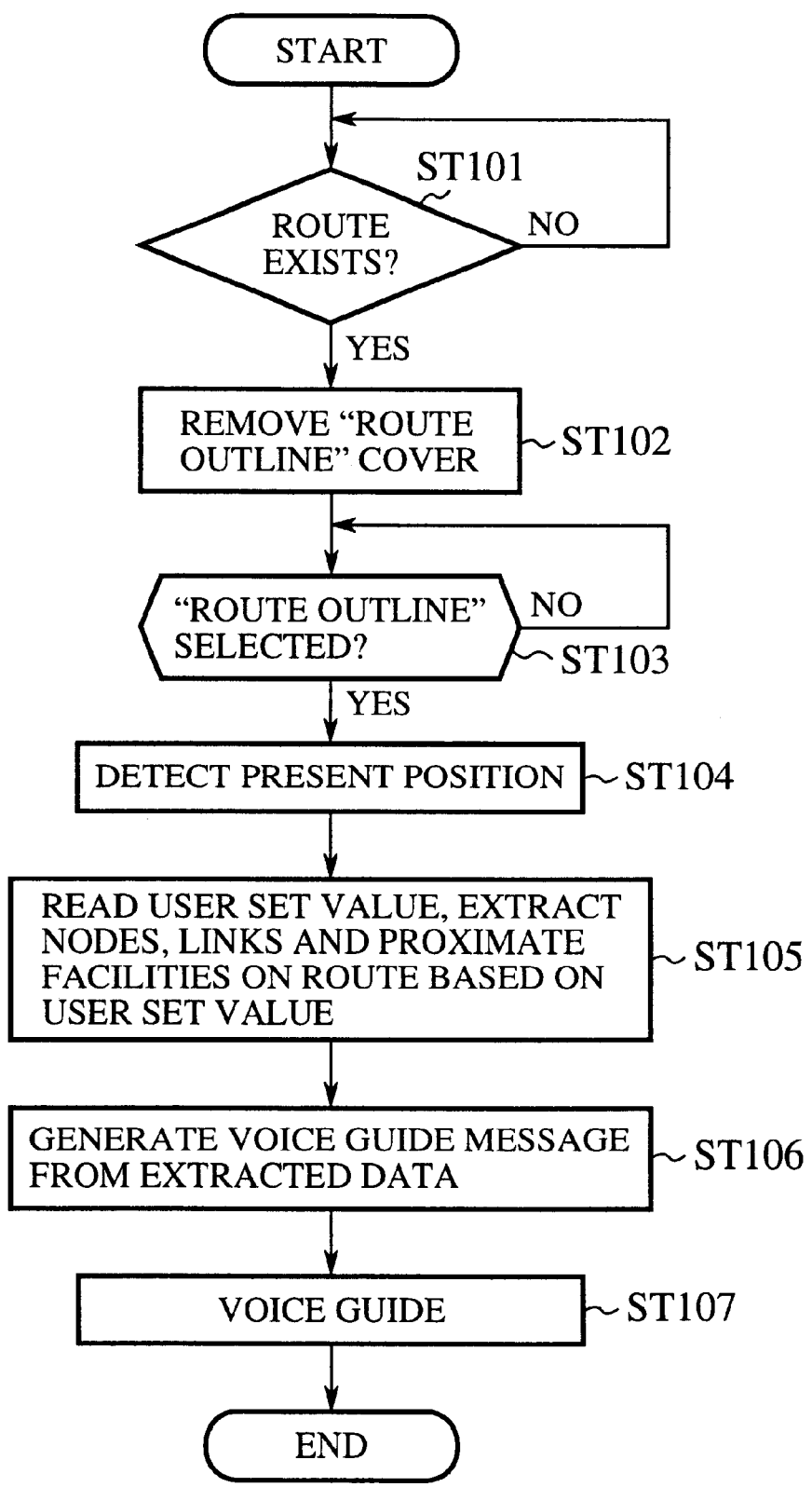
FIG. 10 is a flowchart of the operation of each section in route voice guide processing.

Next, route voice guide processing is performed. FIG. 10 is a flowchart of the operation of each section in route voice guide processing. Firstly, as a result of the route search process being executed, the routine progresses from step ST101 to step ST102 when the route is determined. Thus, the gray cover on the menu option "route outline" is withdrawn allowing this option to be selected. When the option "route outline" is selected, route voice guide processing is performed (step ST103).

Firstly, in a step ST104, a present position of the moving body is detected by the present position detection means 23. Then, in a step ST105, the voice guide information extraction means 30 reads data relating to nodes and links which comprise the determined route and extracts a number of nodes, links and proximate facilities to nodes and links of high importance corresponding to the guide number above based on voice guide information extraction conditions set by the user in the menu (FIG. 9).

Then, in a step ST106, the extracted nodes and links and proximate facilities to nodes and links are supplied to the voice guide message generation means through the control means 21. The voice guide message generation means 27 generates voice guide messages relating to the extracted nodes and links and proximate facilities to nodes and links. When a voice guide message is generated, it is supplied to the voice output means 28 by the control means 21. In a step ST107, the voice guide message is output by the voice output means 28 and an outline of the route from a present position to a guide point is reported to a user.

By adapting the output of voice guide messages in this way, an outline of a searched route may be guided.

Figure 11:
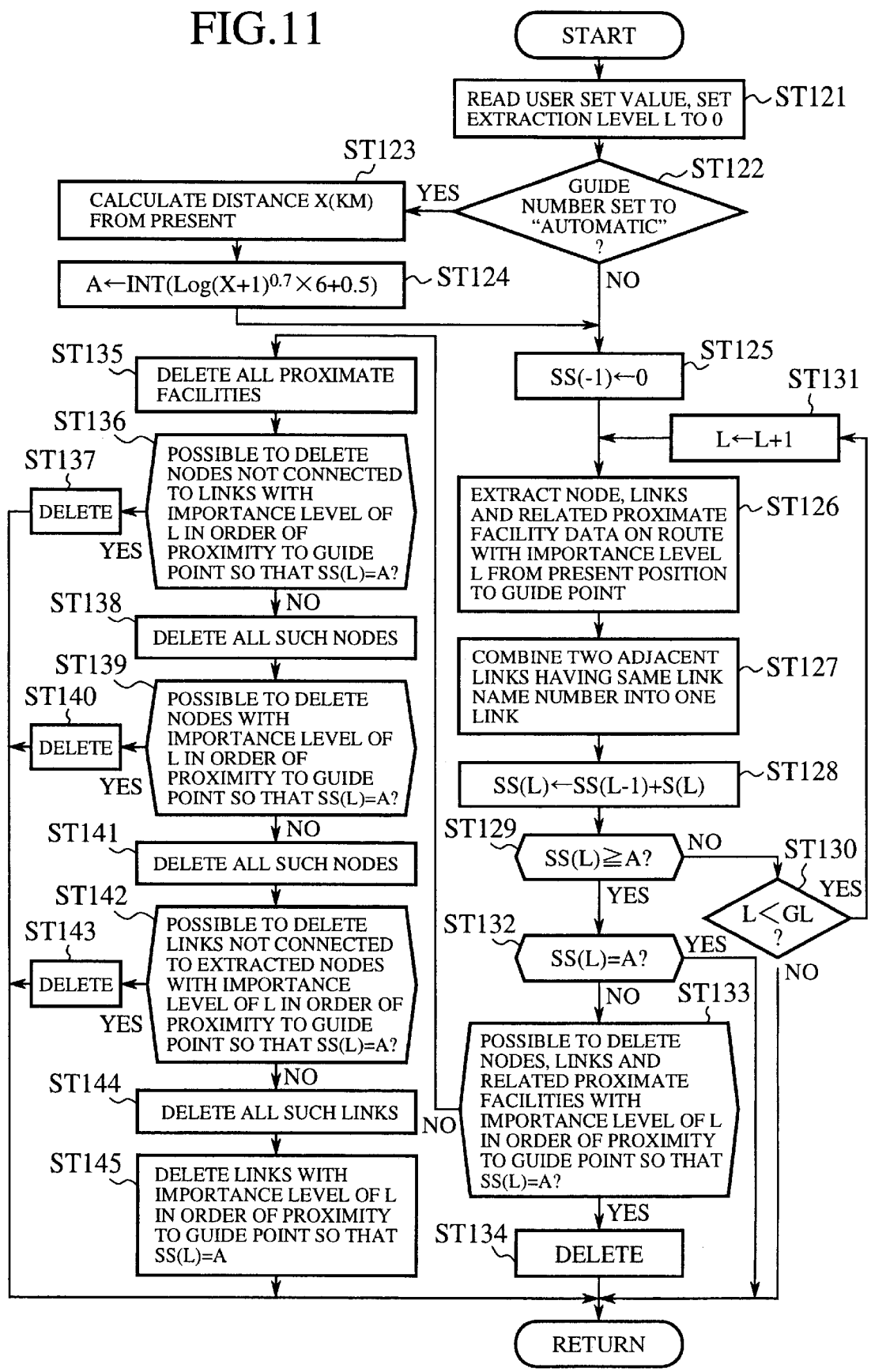
FIG. 11 is a flowchart showing the details of the process of extracting links and nodes as well as the proximate facilities to links and nodes in step ST105 of FIG. 10.

Next, in the above step ST105, the details of the process of extracting nodes and links and proximate facilities to nodes and links will be described. FIG. 11 is a flowchart of the details of the process of extracting nodes and links and proximate facilities to nodes and links in step ST105 in FIG. 10.

Firstly, in a step ST121, the voice guide information extraction means 30 reads information relating to guide level terms, guide number terms and guide point terms set by the user from the control means 21, stores the node number of selected geographical points based on information about the guide point term and stores an extracted guide number A based on information about the guide number term. When "automatic" is selected at this time, the guide number A is stored as 0. The voice guide information extraction means 30 stores a value 100 as a reference value GL when the guide level "high" is selected based on the information of the guide level term. When the selected guide level is "medium", the value 10 is stored as the reference level GL, and when the selected guide level is "low", the value 5 is stored as the reference level GL.

The voice guide information extraction means 30 sets the initial level of the extraction level L of the importance of extracted nodes, links and proximate facilities to 0. (In FIG. 6 these are shown as the facility voice guide level 154, 174, the link voice guide level 165, and the node voice guide level 126). When the extraction level L is 0, proximate facilities and nodes and links which are less than or equal to an extracted level of 0 are extracted and as discussed below, the value of the extraction level L is incremented sequentially by values of 1. Thus, only more important information is extracted as the value of the extraction level L reduces.

In the next step ST122, the voice guide information extraction means 30 determines whether or not the guide number A is 0. That is to say, it is determined whether or not "automatic" has been selected as a guide number term.

The voice guide information extraction means 30 reads link information comprising route determined in the step ST123 from the map information storage means 22 when the guide number A is 0. A route X (kilometers) is calculated from the present position to the guide point (the destination or detour) on the basis of the link information. In step ST124, the guide number A is calculated on the basis of the following formula.

$$A \leftarrow INT(\text{Log }(X+1)^{0.7} \times 6 + 0.5)$$

Figure 12:
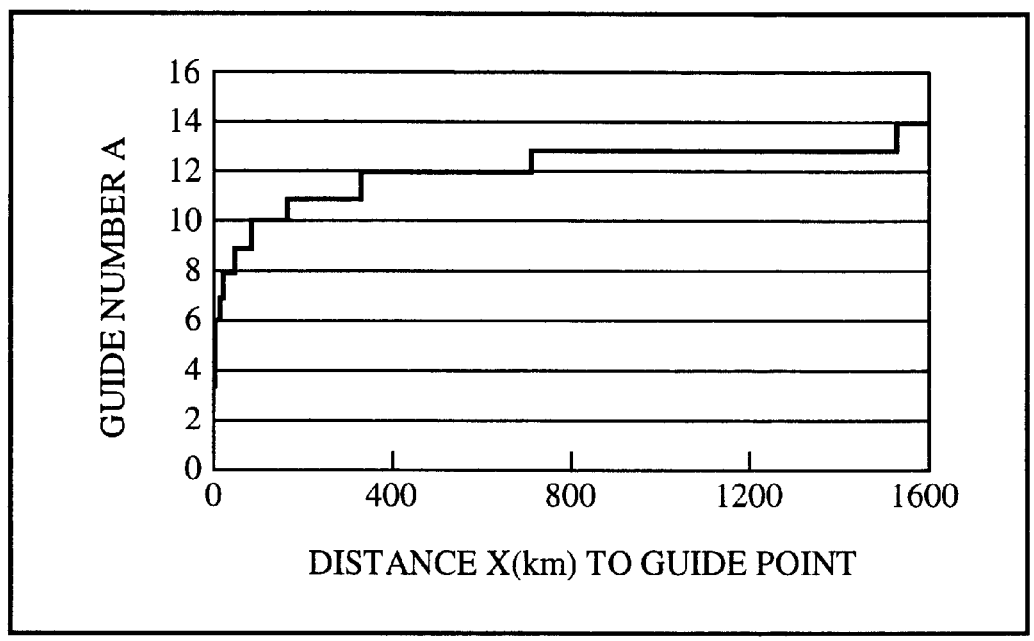
FIG. 12 shows the relative relationship of guide number A and distance X from a present position to a guide point obtained by this formula.

The term $INT(y)$ is a function which outputs an integer which is a real number (y) in which decimal points are rounded off. FIG. 12 shows the corresponding relationship of a guide number A and the distance X from a present position to a guide point obtained by the formula. As shown in FIG. 12, the increment of the guide number A decreases as the distance X increases. In embodiment 1, the guide number A which is set to "automatic" is calculated by the above formula. However, the calculation may be performed on the basis of another formula with distance or other element as a variable. When the guide number A is not equal to 0, the processes in steps ST123 and ST124 are not performed.

In the step ST125, the voice guide information extraction means 30 sets the extraction number SS (L) which shows the total of proximate facilities and nodes and links with an importance of less than the extraction level L, to an initial value of 0.

Then, in a step ST126, the voice guide information extraction means 30 selects and extracts the node voice guide level 126, the link voice guide level 165 and the facility voice guide level 153, 174 as shown in FIG. 6 from the nodes, links and proximate facilities from the present position to the guide point based on information regarding nodes and links which comprise the route which is stored in the route storage memory 25. That is to say, nodes, links and proximate facilities are selected and extracted which have the same level of importance as the extraction level L.

After the nodes, links and proximate facilities which have the same level of importance as the extraction level L are extracted, in a step ST127, the voice guide information extraction means 30 selects links from the extracted links and makes two adjacent links with the same link name number into one link. When the two links are varied into one link in this fashion, the link number, the start intersection number and the link attribute of the link after variation are assigned from that link of the two original links which is nearer the present position. The finish intersection number is assigned from that link of the two original links which is near the guide point. The link length of the link after variation is equal to the sum of the respective lengths of the two original links. Furthermore data relating to proximate facility links of links after variation contains data relating to proximate facility links of the two original links. Thus, the facility position of each proximate facility is calculated and set to a position corresponding to links after variation.

In a step ST128, the voice guide information extraction means 30 updates the extraction number SS (L) by the sum of the number S(L) of extracted nodes, links and related proximate facilities in current step ST126 and the extraction number SS(L−1) when the extraction level L is only smaller by a value of 1.

After the extraction number SS(L) in the extraction level L at this time is calculated, in a step ST129, the voice guide information extraction means 30 determines whether or not the extraction number SS(L) is greater than or equal to the guide number A above. When the extraction number SS(L) is not greater than or equal to the guide number A, in a step ST130, the voice guide information extraction means 30 determines whether the extraction level L is smaller than a reference value GL of the guide level above. When the extraction level L is smaller than the reference level GL of the guide level above, in a step ST131, the value of the extraction level L is increased by 1 and the routine returns to the step ST126. Thus, the extraction of the nodes, links and related proximate facilities corresponding to this extraction level L are executed in the same way.

On the other hand, in a step ST130. when the extracted level L is smaller than the reference value GL of the guide level above, it is determined whether all the nodes, links, and related proximate facilities with a level of importance up to the set reference value GL have been extracted or not and the process of step ST105 is completed.

In the step ST129, when the extracted level SS(L) is greater than the guide number A, in step ST132, the voice guide information extraction means 30 determines whether or not the extraction number SS(L) is the same as the guide number A. When the two are the same, it is determined that a number of nodes, links and proximate facilities of equal to the set guide number A has been extracted and the processing of step ST105 is completed.

In the step ST132, when the extraction number SS(L) is not the same as the guide number A, that is to say, when the extraction number SS is greater than the guide number A, the voice guide information extraction means 30 deletes one of the nodes, links or related proximate facilities by the following process until the extraction number SS(L) equals the guide number A.

Firstly, in a step ST133, the voice guide information extraction means 30 determines that the number of proximate facilities with an extracted level of importance L is greater than the difference (SS(L)-A) of the extraction number SS(L) and the guide number A. The voice guide information extraction means 30 also determines whether it is possible to delete related proximate facilities from the environs of the guide point until the extraction number SS(L) and the guide number A have the same value. When it is determined that it is possible to delete related proximate facilities from the environs of the guide point until the extraction number SS(L) and the guide number A have the same value, the proximate facilities are deleted in a step ST134 and the extraction number SS(L) is made equal to the guide number A.

When the number of proximate facilities with an extraction importance of L is less than the difference (SS(L)-A) of the extraction number SS(L) and the guide number A, in a step ST135, the voice guide information extraction means 30 deletes all the proximate facilities from the extracted nodes, links and related proximate facilities and updates the extraction number SS(L) by subtracting that number of proximate facilities.

Thereafter, in a step ST136, the voice guide information extraction means 30 determines whether the number of nodes from among extracted nodes with an importance of L to which extracted links with an importance of L are not connected is greater than the difference (SS(L)-A) of the extraction number SS(L) and the guide number A. The voice guide information extraction means 30 also determines whether it is possible to delete such nodes from the environs of the guide point until the extraction number SS(L) and the guide number A have the same value. When it is determined that it is possible to delete nodes from the environs of the guide point until the extraction number SS(L) and the guide number A have the same value, the nodes are deleted in a step ST137 and the extraction number SS(L) is made equal to the guide number A.

When the number of nodes to which extracted links with an importance of L are not connected is less than the difference (SS(L)-A) of the extraction number SS(L) and the guide number A, in a step ST138, the voice guide information extraction means 30 deletes all nodes to which extracted links with an importance of L are not connected from the extracted nodes, links and related proximate facilities and updates the extraction number SS(L) by subtracting that number of nodes.

Thereafter, in a step ST139, the voice guide information extraction means 30 determines whether the number of remaining extracted nodes with an importance of L is greater than the difference (SS(L)-A) of the extraction number SS(L) and the guide number A. The voice guide information extraction means 30 also determines whether it is possible to delete such nodes from the environs of the guide point until the extraction number SS(L) and the guide number A have the same value. When it is determined that it is possible to delete nodes from the environs of the guide point until the extraction number SS(L) and the guide number A have the same value, the nodes are deleted in a step ST140 and the extraction number SS(L) is made equal to the guide number A.

When the number of remaining extracted nodes with an importance of L is less than the difference (SS(L)-A) of the extraction number SS(L) and the guide number A, in a step ST141, the voice guide information extraction means 30 deletes all remaining extracted nodes with an importance of L from the extracted nodes, links and related proximate facilities and updates the extraction number SS(L) by subtracting that number of nodes.

Thereafter, in a step ST142, the voice guide information extraction means 30 determines whether the number of links to which extracted nodes with an importance of L are not connected is greater than the difference (SS(L)-A) of the extraction number SS(L) and the guide number A. The voice guide information extraction means 30 also determines whether it is possible to delete such links from the environs of the guide point until the extraction number SS(L) and the guide number A have the same value. When it is determined that it is possible to delete such links from the environs of the guide point until the extraction number SS(L) and the guide number A have the same value, the links are deleted in a step ST 143 and the extraction number SS(L) is made equal to the guide number A.

When the number of links to which extracted nodes with an importance of L are not connected is less than the difference (SS(L)-A) of the extraction number SS(L) and the guide number A, in a step ST144, the voice guide information extraction means 30 deletes all such links from the extracted nodes, links and related proximate facilities and updates the extraction number SS(L) by subtracting the total number of nodes.

Thereafter, in a step ST145, the voice guide information extraction means 30 deletes links near to the guide point from the remaining extracted links which have an importance of L and thus makes the extraction number SS(L) equal to the guide number A.

In such a way, nodes and the like are extracted in order of importance and when the extraction number SS(L) is greater than the guide number A, nodes and the like are deleted from near the guide point until the same number of nodes or the like as the guide point A near the present position is selected. After the extraction number SS(L) and the guide number A are made equal, the process of step ST105 is completed.

Figure 13:
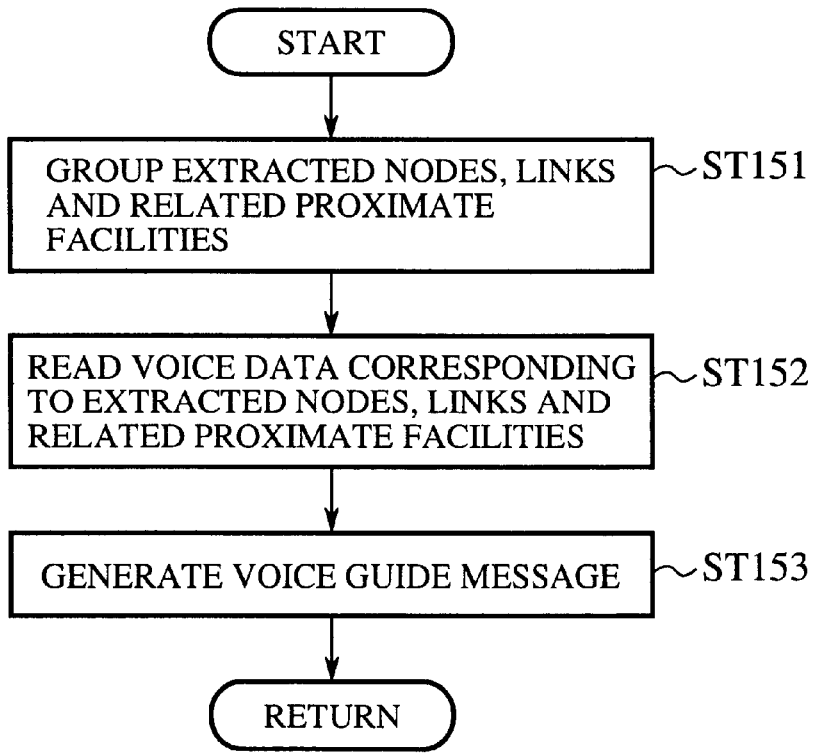
FIG. 13 is a flowchart showing the details of the process of generating a voice guide message for extracted links and nodes as well as the proximate facilities to links and nodes in step ST106 of FIG. 10.

The process of generating a voice guide message regarding extracted links, nodes and proximate facilities of links or nodes in a step ST106 will be described below. FIG. 13 is a flowchart showing the details of the process of generating a voice guide message for extracted links and nodes as well as the proximate facilities of links and nodes in step ST106 of FIG. 10.

After extracted links and nodes as well as the proximate facilities to links and nodes are supplied to the voice guide message generating means 27 through the control means 27, in a step 151, the voice guide message generating means 27 firstly output data relating to extracted links and nodes as well as the proximate facilities to links and nodes in order of data proximate to a present position. At this time, the data relating to node proximate facilities is stated with the node proximate facility closer to the present position than the node. The data relating to link proximate facilities is stated with the link proximate facility further from the present position than the link.

The voice guide message generation means 27 adds a group flag GF to data related to nodes, links and related proximate facilities comprising the route. Thereafter a value of 1 is assigned to the group flag GF of the mutually connected nodes and links, to nodes and related proximate facilities to that node, or to nodes, links and proximate facilities related to links and proximate facilities to that link. However, the group flag GF of data which is closest to the guide point in the group is set to a value of 0.

Next, in a step ST152, the voice guide message generation means 27 extracts voice waveform data corresponding to extracted nodes, links and proximate facilities related to nodes and links from the stored voice information storage means 31. Such voice waveform data consists of the names of nodes, names of links, or the names of proximate facilities related to nodes and links.

In a step ST153, the voice guide message generation means 27 takes out supplementary voice data corresponding to predicates from the voice information storage means 31 and generates a voice guide message containing the previously taken out voice waveform data for each name.

FIG. 14 shows an example of a set of supplementary voice data. When the supplementary voice data shown in FIG. 14 is pre-stored in the voice information storage means 31, a voice guide message is generated by one of the following procedures by adding supplementary voice data to each name of nodes or the like in the stated order of step ST151 and then stating the data sequentially.

Procedure 1.

When a right turn is made on the route at a node, supplementary voice data (make right turn.) of distinguishing number 301 is added after the voice waveform data of the node name when the group flag GF has a value of 0. When the group flag GF has a value of 1, supplementary voice data (make right turn and . . . ) of distinguishing number 401 is added.

Procedure 2.

When a left turn is made on the route at a node, supplementary voice data (make left turn.) of distinguishing number 302 is added after the voice waveform data of the node name when the group flag GF has a value of 0. When the group flag GF has a value of 1, supplementary voice data (make left turn and.. ) of distinguishing number 402 is added.

Procedure 3.

When a vehicle continues traveling in the same direction on the route at a node, supplementary voice data (continue straight.) of distinguishing number 303 is added after the voice waveform data of the node name when the group flag GF has a value of 0. When the group flag GF has a value of 1, supplementary voice data (continue straight and . . . ) of distinguishing number 403 is added.

Procedure 4.

When a vehicle makes a U-turn on the route at a node, supplementary voice data (make a U-turn) of distinguishing number 304 is added after the voice waveform data of the node name when the group flag GF has a value of 0. When the group flag GF has a value of 1, supplementary voice data (make a U-turn and) of distinguishing number 404 is added.

Procedure 5.

When a vehicle continues traveling in the same direction on the route at a link, supplementary voice data (continue straight.) of distinguishing number 303 is added after the voice waveform data of the link name when the group flag GF has a value of 0. When the group flag GF has a value of 1, supplementary voice data (continue straight and . . . ) of distinguishing number 403 is added.

Procedure 6.

When a link is a bridge, supplementary voice data ( . . . cross.) of distinguishing number 305 is added after the voice waveform data of the link name when the group flag GF has a value of 0. When the group flag GF has a value of 1, supplementary voice data ( . . . cross and . . . ) of distinguishing number 405 is added.

Procedure 7.

When a node is an entrance to an expressway, supplementary voice data (enter . . . ) of distinguishing number 306 is added after the voice waveform data of the node name when the group flag GF has a value of 0. When the group flag GF has a value of 1, supplementary voice data (enter and . . . ) of distinguishing number 406 is added.

Procedure 8.

When a node is an exit of an expressway, supplementary voice data (exit . . . ) of distinguishing number 307 is added after the voice waveform data of the node name when the group flag GF has a value of 0. When the group flag GF has a value of 1, supplementary voice data (exit . . . and . . . ) of distinguishing number 407 is added.

Procedure 9.

When the group flag GF has a value of 0 at a link proximate facility, supplementary voice data (pass on the . . . side) of distinguishing number 308 is added after the voice waveform data of the link proximate facility name. When the group flag GF has a value of 1, supplementary voice data (pass on the . . . side and . . . ) of distinguishing number 408 is added.

Procedure 10.

When the group flag GF has a value of 0, the route turns to the right at a node which is a node proximate facility, supplementary voice data (turn right at the mark) of distinguishing number 309 is added after the voice waveform data of the node proximate facility name. When the group flag GF has a value of 1, supplementary voice data (at the mark . . . ) of distinguishing number 409 is added.

Procedure 11.

When the group flag GF has a value of 0, the route turns to the left at a node which is a node proximate facility and supplementary voice data (turn left at the mark) of distinguishing number 310 is added after the voice waveform data of the node proximate facility name. When the group flag GF has a value of 1, supplementary voice data (at the mark . . . ) of distinguishing number 409 is added.

Procedure 12.

When the group flag GF has a value of 0, the route continues in the same direction at a node which is a node proximate facility and supplementary voice data (continue straight at the mark) of distinguishing number 311 is added after the voice waveform data of the node proximate facility name. When the group flag GF has a value of 1, supplementary voice data (continue straight at the mark) of distinguishing number 409 is added.

The route search means 24 predetermines whether the route turns left or right or continues straight at each node or whether a link is a bridge.

Figures 16, 17:
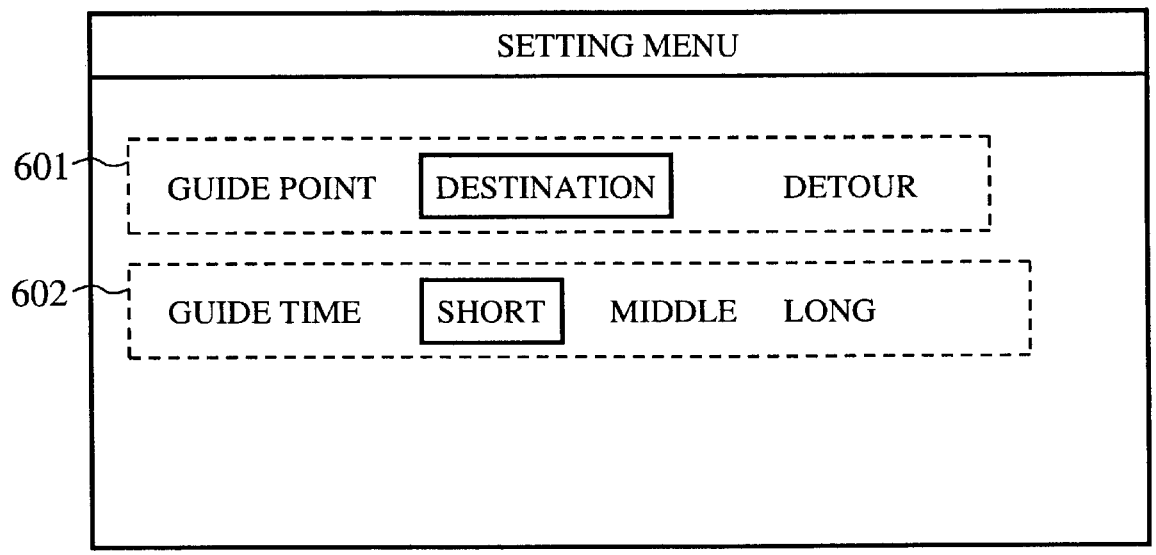
FIG. 16 shows a voice guide message generated based on the data shown in FIG. 15.
FIG. 17 shows a display example of a menu for each category of setting of route voice guides according to a second embodiment.

FIG. 15 shows data related to extracted nodes, links and proximate facilities of nodes and links through a process shown in FIG. 11 with respect to the route shows in FIG. 8. FIG. 16 shows a voice guide message generated based on data shown in FIG. 15. The link L001 shown in FIG. 15 is a single link made up of links L001, L002, L003 in FIG. 8 by the process of step ST127 shown in FIG. 11. In the same way, the link L005 shown in FIG. 15 is a single link made up of links L005, L006, L007 in FIG. 8. The link proximate facility S251 (not shown) belongs to the link L002 in FIG. 8, however it is varied to belong to the link L001 after variation by the process of step ST127.

In the step ST151 as shown in FIG. 13, the link L001, the link proximate facility S251 and the node N005 is made into a group 500 and the node N006, the link L005 and the node N009 are made into the group 501. A voice guide message shown in FIG. 16 is generated by steps ST152, ST153 in FIG. 13 with respect to extracted nodes, links and proximate facilities to nodes and links.

In such a way, a voice guide message is generated and output to the voice output means 28.

As shown above, according to embodiment 1, the importance of nodes and links is stored. Nodes and links are selected from amongst nodes and links on a searched route based on their importance. Voice guide messages are generated with respect to selected nodes and links and such messages are used to execute guiding of a route by voice commands. Thus, it is possible to guide an entire route appropriately in a short time by voice.

Furthermore, when a plurality of nodes and links which have equal importance exist and their number does not equal a predetermined reference number, a number of nodes which equals the predetermined reference number is selected from those nodes of equal importance near to a present position. Thus, it is possible to accurately correspond the number of guided nodes or the like with a predetermined reference number.

Embodiment 2

The navigation device according to embodiment 2 of the present invention summarizes nodes, links and related proximate facilities on the route which are voiced guided based on a guide time pre-set by a user instead of summarizing on the basis of the level of importance and predetermined guide number of nodes, links and related proximate facilities on the voiced-guided route. That is to say, this is a variation on the process (FIG. 11) of step ST105 in FIG. 10 of the navigation device according to the first embodiment.

Thus, according to embodiment 2, the summarizing process entails summarizing nodes, links and related proximate facilities on the voiced-guided route. In other respects, the present embodiment is the same as the first embodiment and such description will be omitted.

Before the route voice guide process, all types of settings related to the route voice guiding are executed. Firstly, the control means 21 displays a menu on the display means 26 for all types of settings for route voice guiding. FIG. 17 shows a display example of a menu for displaying each type of setting for route voice guiding according to embodiment 2.

The menu shown in FIG. 17 comprises a guide point selection term 601 which sets the execution of route voice guiding from a present position to a given geographical point and a guide time selection term 602 which sets a guide time for voice guiding of the route from a present position to a guide point.

The guide point selection term 601 contains the options "destination" and "detour". The selection of the options is executed by a user operating the operational means 29. When "destination" is selected, route voice guiding from a present position to a destination is executed. When "detour" is set, route voice guiding from a present position to a predetermined detour point is executed. The guide point selection term 601 in FIG. 17 has one option "detour". However, a plurality of detours may be selected as options or the user may add "selectable geographic points" as options to select a final geographic point for voice guiding.

The guide time selection term 602 has the options "short", "middle" and "long". The selection of these options is executed by a user operating the operational means 29. When "short" is selected by a user with respect to nodes, links and related proximate facilities on a route, voice guiding is performed for approximately 15 sec. When "middle" is selected, voice guiding is performed for approximately 30 sec. When "long" is selected, voice guiding is performed for approximately 1 minute. The user may directly select a time limit for voice guiding with a figure.

Figure 18:
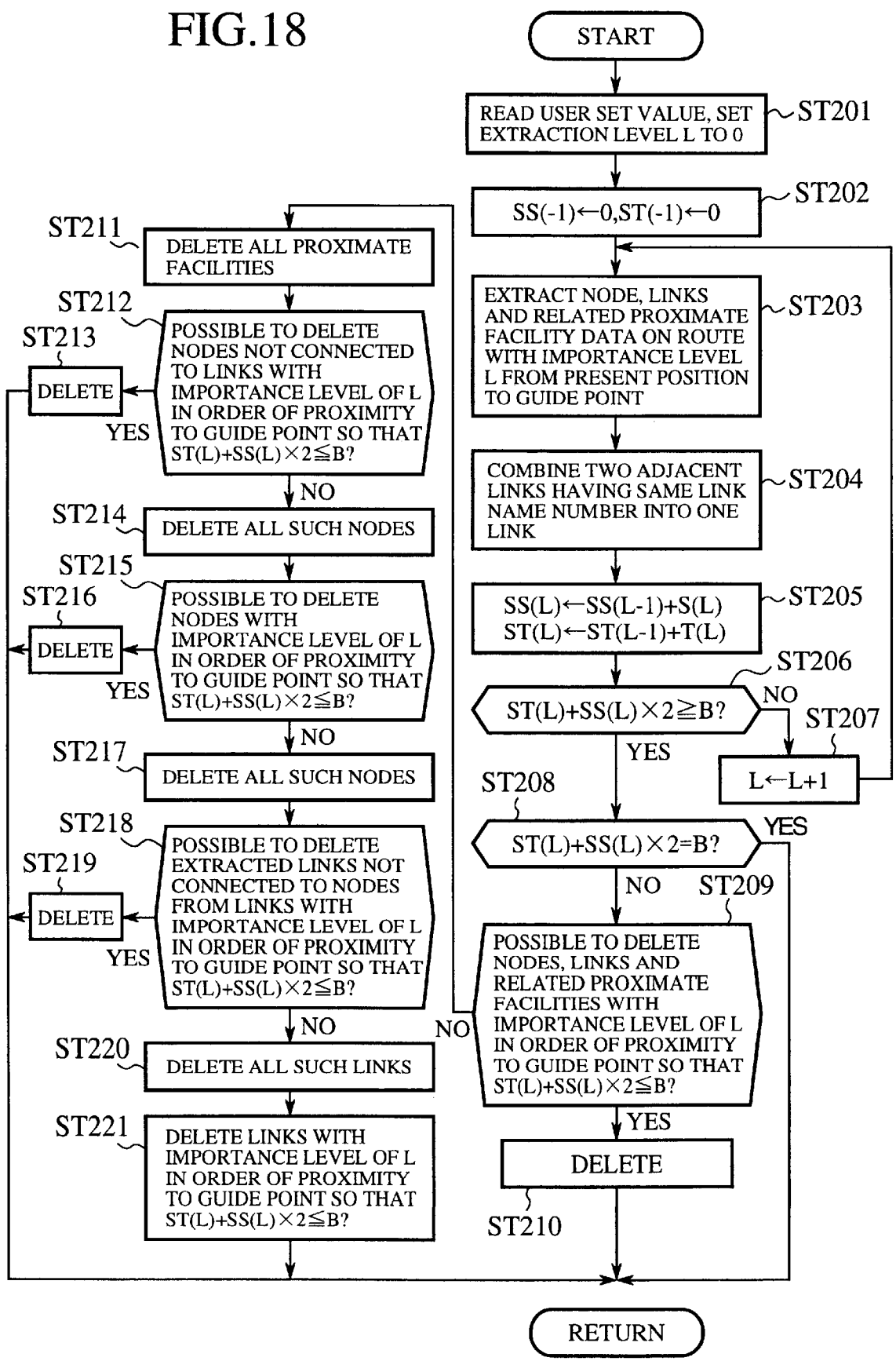
FIG. 18 is a flowchart showing the details of the process of extracting links and nodes as well as the proximate facilities to links and nodes in a second embodiment.

Now the extraction process of nodes, links and related proximate facilities according to embodiment 2 will be described. FIG. 18 is a flowchart showing the details of the process of extracting links and nodes as well as the proximate facilities of links and nodes in a second embodiment.

Firstly, in a step ST201, the voice guiding information extraction means 30 reads information relating to guide time terms and guide point terms set by a user from the control means 21. The node number of the selected geographical point is stored based on information relating to the guide point term. A selected guide time is set to a reference value B for guide times based on information relating to the guide time term. The voice guide information extraction means 30 set an extraction level L which shows the importance of extracted nodes, links and related proximate facilities (in FIG. 6, a node voice guiding level 126, a link voice guiding level 165 and a facility voice guiding level 154, 174) to a value of 0. When the extraction level L is 0, the nodes, links and related facilities with an extraction level of equal to or less than 0 are extracted. As described below, the value of the extraction level L is sequentially incremented by values of 1. Thus, only increasingly important information is extracted at lower extraction level values L.

In a step ST202, a voice guiding information extraction means 30 sets an initial value 0 to an extraction number SS(L) which shows the total number of nodes, links and related facilities with an importance equal to or less than an extraction level of L. An initial value 0 is set to a total guide time ST(L) which is required to voice guide nodes, links and related facilities with a level of importance less than or equal to an extraction level L.

Then, in the step ST203, the voice guiding information extraction means 30 selects and extracts node voice guiding level 126, link voice guiding level 165 and facility voice guiding level 154, 174 shown in FIG. 6, that is to say, nodes, links and related facilities which have an equal extraction level L of importance from amongst the nodes, links and related proximate facilities from a present point to a guide point based on node and link information comprising a route stored in the route storage means 25.

After selecting and extracting nodes, links and related facilities which have an equal extraction level L of importance, in a step ST204, of the extracted links, the voice guiding information extraction means 30 converts two adjacent links with the same link name number into one link. When two such links are converted into one link, the link number of the link after conversion, the start intersection number and the link attribute are assigned from the link of the two original links which is nearer to the present position. The finish intersection point number is assigned from the link of the two original links which is nearer to the guide point. The link length of the link after conversion is the sum of the link lengths of the two original links. With respect to data about the link proximate facilities of the link after conversion, data is stored with respect to the proximate facilities of the two original links and facility positions for each type of proximate facility is calculated and set to a position which corresponds to the link after conversion.

In step ST205, the voice guiding information extraction means 30 updates the extraction number SS(L) by the sum of the number S(L) of extracted nodes, links and related proximate facilities in the current step ST203 and the extraction number SS(L−1) in which the extraction level L is smaller by a value of 1. Further it updates the total guiding time ST(L) by the sum of the number T(L) of guiding time required for extracted nodes, links and related proximate facilities in the current step ST203 and the total guiding time ST(L−1) in which the extraction level L is smaller by a value of 1. The sum T(L) of guiding time required for extracted nodes, links and related proximate facilities is the total of the node voice guiding time 127, the facility voice guiding time 155, the link voice guiding time 166 and the facility voice guiding time 175 in the map information data shown in FIG. 6.

After the calculation of the extraction number SS(L) and the total guiding time ST(L) in the extraction level L at that point in time, in a step ST206, the voice guiding information extraction means 30 determines whether or not twice the sum of the total guiding time ST(L) and the extraction number SS(L): (ST(L)+SS(L)×2) is less than or equal to the reference value B above.

The comparison of twice the sum of the total guiding time ST(L) and the extraction number SS(L): (ST(L)+SS(L)×2) with the reference value B above is performed for the following reason. The total guide time ST(L) is the total sum of voice playing times for names such as extracted nodes. In addition, the voice playing time required for supplementary voice data referred to above which is added to each node is on average two seconds. The playing time for voice guide messages up to an extraction level 1 at that time thus becomes (ST(L)+SS(L)×2). Thus, when other supplementary voice data is used, (ST(L)+SS(L)×Ts) is compared with a reference value B based on an average playing time Ts for supplementary voice data in response to the length of the supplementary voice data.

When the voice guide message playing time to an extraction level L (ST(L)+SS(L)×2) is not greater than or equal to the reference value B, after the value of the extraction level L is increased by a value of 1 in a step ST207, the routine returns to step ST203 and the extraction of nodes, links and related proximate facilities which correspond to an extraction level L is executed in the same way.

On the other hand, when the voice guide message playing time to an extraction level L is greater than or equal to a reference level B, in a step ST208, the voice guiding information extraction means 30 determines whether or not the voice guide message playing time to an extraction level L is the same as the reference level B. When both are the same, it is determined that the nodes, links and related proximate facilities in a set guide time have been extracted and the routine is completed.

When the voice guide message playing time to an extraction level L is not the same as a reference level B, that is to say, the voice guide message playing time to an extraction level L (ST(L)+SS(L)×2) is greater than a reference level B, the voice guiding information extraction means 30 deletes by the following process any of the nodes, links and related facilities with a level of importance L until the voice guide message playing time to an extraction level L (ST(L)+SS (L)×2) is less than or equal to a reference level B.

Firstly, in a step ST209, the voice guiding information extraction means 30 determines that the sum of the facility voice guiding time for proximate facilities with an extracted importance of L is greater than the difference of the voice guide message playing time to an extraction level L (ST (L)+SS(L)×2) and a reference level B. Then, it is determined whether or not it is possible to delete from those proximate facilities which are near to guide points until the voice guide message playing time is less than or equal to the reference value B. When it is determined that it is possible to delete from those proximate facilities which are near to guide points until the voice guide message playing time is less than or equal to the reference value B, in a step ST210 such proximate facilities are deleted until the voice guide message playing time is less than or equal to the reference value B.

On the other hand, when it is determined that the sum of the facility voice guiding time for proximate facilities with an extracted importance of L is smaller than the difference of the voice guide message playing time to an extraction level L and the reference level B, in a step ST211, the voice guiding information extraction means 30 deletes all proximate facilities from extracted nodes, links and related proximate facilities, reduces the total guide time ST(L) by the sum of the facility voice guide time for proximate facilities and updates the value. Also the value is updated by reducing the value of the extraction number SS(L) by the total number of proximate facilities.

Thereafter, in a step ST212, of the nodes which have an extracted importance of L, the voice guiding information extraction means 30 determines that the sum of the node voice guiding time for nodes with an extracted importance of L to which links are not connected is greater than the difference of the voice guide message playing time to an extraction level L and a reference level B. Then, it is determined whether or not it is possible to delete from those nodes which are near to guide points until the voice guide message playing time is less than or equal to the reference value B. When it is determined that it is possible to delete from those nodes which are near to guide points until the voice guide message playing time is less than or equal to the reference value B, in a step ST213 such nodes are deleted until the voice guide message playing time is less than or equal to the reference value B.

On the other hand, when it is determined that the sum of the node voice guiding time for nodes with an extracted importance of L not connected to links is smaller than the difference of the voice guide message playing time to an extraction level L and the reference level B, in a step ST214, the voice guiding information extraction means 30 deletes all nodes which have an extracted importance of L not connected to links from extracted nodes, links and related proximate facilities, reduces the total guide time ST(L) by the sum of the node voice guide time for such nodes and updates the value. Also the value is updated by reducing the value of the extraction number SS(L) by the total number of nodes.

Thereafter, in a step ST215, the voice guiding information extraction means 30 determines that the sum of the node voice guiding time for remaining nodes which have an extracted importance of L is greater than or equal to the difference of the voice guide message playing time to an extraction level L and a reference level B. Then, it is determined whether or not it is possible to delete from those nodes which are near to guide points until the voice guide message playing time is less than or equal to the reference value B. When it is determined that it is possible to delete from those nodes which are near to guide points until the voice guide message playing time is less than or equal to the reference value B, in a step ST216 such nodes are deleted until the voice guide message playing time is less than or equal to the reference value B.

On the other hand, when the sum of the node voice guiding time for remaining nodes which have an extracted importance of L is smaller than the difference of the voice guide message playing time to an extraction level L and a reference level B, the voice guiding information extraction means 30, in a step ST217, deletes all remaining nodes which have an extracted importance of L from the extracted nodes, links and related proximate facilities. The value for the total guide time ST(L) is reduced by the sum of the node voice guiding times for such nodes and the value is updated. Also, the value for extraction number SS(L) is updated by being reduced by the total number of such nodes.

Thereafter, in a step ST218, the voice guiding information extraction means 30 determines that of links with an extracted importance of L, the sum of the link voice guiding time for links with an extracted importance of L not connected to nodes is greater than the difference of the voice guide message playing time to an extraction level L and a reference level B. Then, it is determined whether or not it is possible to delete from those links which are near to guide points until the voice guide message playing time is less than or equal to the reference value B. When it is determined that it is possible to delete links which are near to guide points until the voice guide message playing time is less than or equal to the reference value B, in a step ST219 such nodes are deleted until the voice guide message playing time is less than or equal to the reference value B.

On the other hand, when the sum of the link voice guiding time for links not connected to nodes which have an extracted importance of L is smaller than the difference of the voice guide message playing time with an extraction level L and a reference level B, the voice guiding information extraction means 30, in a step ST220, deletes all such links from the extracted nodes, links and related proximate facilities. The value for the total guide time ST(L) is reduced by the sum of the link voice guiding times for such links and the value is updated. Also, the value for extraction number SS(L) is updated by being reduced by the total number of such links.

Thereafter, in a step ST221, the voice guiding information extraction means 30 deletes such links which are near to guide points from the remaining links with an extracted importance of L until the voice guide message playing time is less than or equal to the reference value B.

In such a way, when nodes of high importance are extracted sequentially and a voice guide message playing time (ST(L)+SS(L)×2) to an extraction level L is greater than or equal to a reference value B of a guide time, a guide time is selected in a range of basic values for guide times by deleting nodes and the like in order of those near guide points. Thus, after the playing time of the voice guide message is less than or equal to a reference value for playing times, the routine is completed.

As shown above, according to embodiment 2, when there are a plurality of links and nodes with the same level of importance and when playing time of the voice guide message is greater than a predetermined reference value, nodes or the like are selected from the nodes and links with the same level of importance from those near to a present position so that the playing time of the voice guide message is less than a predetermined reference value. Thus, it is possible to make the time for voice guiding to be accurately less than or equal to a predetermined reference value.

The present invention is not limited to embodiments 1 and 2 above and may be applied through other embodiments. For example, the extraction method of guiding points may vary the node or link extraction conditions.

Furthermore, the voice-guide message generated by the voice guide message generation means 27 may generate messages which guide the position of a facility, a time or a distance apart from the examples discussed above. Furthermore, the invention may be adapted to generate a voice-guide message by combining simple phrases by the insertion of conjunctions between phrases.

Furthermore, during voice guiding, the route from a present position to a guide point is displayed on the same screen. The position of those nodes, links and related proximate facilities which correspond to information which voice guided may be displayed in a different color from other parts or may be displayed by a blinking light.

As shown above, the present invention is adapted for use in a navigation device in which the level of importance of each node and link is stored as a part of map information in a map information storage means. Nodes and links from amongst the nodes and links on the searched route are selected on the basis of the level of importance and a voice guide message is generated which corresponds to the selected nodes and links. Thus, it is possible to guide an entire route appropriately in a short time by voice and it is possible for a user to easily arrive at a destination.

What is claimed is:

1. A navigation device comprising a map information storage means for storing map information including node information, line information and related information thereof, a present position detection means for detecting a present position of a moving body, a route searching means for searching a route from the present position to a guide point based on said map information, a voice guide message generation means for generating a voice guide message corresponding to the route searched by said route searching means, and a voice output means for outputting the voice guide message, wherein:

said map information storage means stores a level of importance of each node and link as a part of said map information; and said voice guide message generation means selects the nodes and links on the searched route based on said level of importance and generates the voice guide message corresponding to the selected nodes and links, wherein said voice guide message generation means selects said nodes and links on the searched route in such a manner that a level of importance of the selected nodes and links is less than or equal to a predetermined reference value and a number of the selected nodes and links is less than or equal to a predetermined reference number, and generates the voice guide message corresponding to the selected nodes and links.

2. A navigation device according to claim 1, wherein when a plurality of nodes and links with the same level of importance exists and the number of the selected nodes and links is not equal to the predetermined reference number, said voice guide message generation means deletes nodes and links, which are located near the guide point, from said plural nodes and links with the same level of importance in such a manner that the number of the selected nodes and links is equal to the predetermined reference number.

3. A navigation device according to claim 1, further comprising a reference value setting means for setting the predetermined reference value and a reference number setting means for setting the predetermined reference number.

4. A navigation device according to claim 1, wherein said map information storage means stores information about voice playing times relating to names of each node and link as a part of said map information, and wherein said voice guide message generation means selects said nodes and links on the searched route in order of high importance in such a manner that the voice playing time for the voice guide message is less than or equal to a predetermined reference value and generates the voice guide message corresponding to said selected nodes and links.

5. A navigation device comprising,
   a storage device having map information including node information, link information, and related information stored thereon;
   a position detector configured to detect a present position of a moving body;
   a voice output device; and
   a processor coupled to the storage device the position detector and the voice output device, the processor searching a route from the present position to a guide point based on the stored map information, the processor generating a voice guide message corresponding to the searched route, the processor configured to:
   store a level of importance of each node and link as part of the map information;
   select the nodes and links on the searched route based on the level of importance and generating the voice guide message corresponding to the selected nodes and links,
   select the nodes and links on the searched route such that the level of importance of the selected nodes and links is less than or equal to a predetermined referenced value and a number the selected nodes and links is less than or equal to a predetermined reference number; and
   generate the voice guide message corresponding to the selected nodes and links.

6. The navigation device according to claim 5, wherein the processor is further configured to delete nodes and links if the number of selected nodes and links is not equal to the predetermined reference number and if a plurality of nodes and links have the same level of importance such that the number of selected nodes and links is equal to the predetermined reference number.

7. The navigation device according to claim 5, wherein the processor is further configured to set the predetermined reference value and the predetermined reference number.

8. The navigation device according to claim 5, wherein the map information further includes information associated with voice playing times relating to names of each node and link and wherein the processor is further configured to:
   select the nodes and links on the searched route in order of highest level of importance such that the voice playing time for the voice guide message associated with selected nodes and links is less than or equal to a predetermined reference value; and
   generate the voice guide message corresponding to the selected nodes and links.

* * * * *